United States Patent
Enomoto et al.

(10) Patent No.: US 9,132,746 B2
(45) Date of Patent: Sep. 15, 2015

(54) METHOD AND SYSTEM FOR REDUCING RANGE ANXIETY

(71) Applicants: Tomoyuki Enomoto, Los Angeles, CA (US); Atsushi Nakano, Los Angeles, CA (US)

(72) Inventors: Tomoyuki Enomoto, Los Angeles, CA (US); Atsushi Nakano, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 49 days.

(21) Appl. No.: 13/968,149

(22) Filed: Aug. 15, 2013

(65) Prior Publication Data

US 2015/0051763 A1   Feb. 19, 2015

(51) Int. Cl.
| | |
|---|---|
| *B60L 11/00* | (2006.01) |
| *B60L 11/18* | (2006.01) |
| *B60L 3/12* | (2006.01) |
| *G01C 21/36* | (2006.01) |

(52) U.S. Cl.
CPC .............. *B60L 11/1862* (2013.01); *B60L 3/12* (2013.01); *G01C 21/3682* (2013.01)

(58) Field of Classification Search
CPC ........... B60L 11/1862; B60L 11/1861; B60L 11/1857; B60L 11/1816; B60L 11/187
USPC ............ 701/1, 22; 340/995.17; 320/109, 134
See application file for complete search history.

(56) References Cited

U.S. PATENT DOCUMENTS

| | | | |
|---|---|---|---|
| 4,484,192 A | 11/1984 | Seitz et al. | |
| 5,539,399 A | 7/1996 | Takahira et al. | |
| 5,815,824 A | 9/1998 | Saga et al. | |
| 7,181,337 B2 | 2/2007 | Kosaka | |
| 7,743,337 B1 | 6/2010 | Maeda et al. | |
| 8,301,365 B2 | 10/2012 | Niwa et al. | |
| 8,332,096 B2 | 12/2012 | Riegelman et al. | |
| 8,417,401 B2 | 4/2013 | Takahara et al. | |
| 8,868,025 B2 * | 10/2014 | Ganesh et al. | 455/404.1 |
| 2006/0113129 A1 * | 6/2006 | Tabata | 180/65.2 |
| 2009/0082957 A1 | 3/2009 | Agassi et al. | |
| 2010/0094496 A1 | 4/2010 | Hershkovitz et al. | |
| 2010/0235779 A1 | 9/2010 | Maeda et al. | |
| 2011/0112710 A1 | 5/2011 | Meyer-Ebeling et al. | |
| 2012/0112903 A1 * | 5/2012 | Kaib et al. | 340/539.12 |
| 2012/0143410 A1 | 6/2012 | Gallagher et al. | |
| 2012/0179311 A1 | 7/2012 | Skaff et al. | |
| 2012/0179314 A1 | 7/2012 | Gilman et al. | |
| 2012/0191279 A1 | 7/2012 | Wippler | |
| 2012/0203457 A1 | 8/2012 | Casey et al. | |
| 2012/0253655 A1 | 10/2012 | Yamada et al. | |
| 2013/0009765 A1 | 1/2013 | Gilman et al. | |
| 2013/0024112 A1 | 1/2013 | Tate, Jr. | |
| 2013/0041552 A1 | 2/2013 | MacNeille et al. | |
| 2013/0173097 A1 * | 7/2013 | Jotanovic | 701/22 |

\* cited by examiner

*Primary Examiner* — Gertrude Arthur Jeanglaude
(74) *Attorney, Agent, or Firm* — Armstrong Teasdale LLP

(57) ABSTRACT

A first range, a second range, and a third range are determined for a state-of-charge associated with a battery. The second range is determined based on a first set of information. The third range is determined based on a second set of information different from the first set of information. A map including a first zone associated with the first range, a second zone associated with the second range, and a third zone associated with the third range is displayed.

19 Claims, 6 Drawing Sheets

METHOD AND SYSTEM FOR REDUCING RANGE ANXIETY

BACKGROUND

The present disclosure relates to human-machine interface (HMI) systems and, more particularly, to methods and systems for reducing range anxiety in an electric vehicle including a battery.

At least some electric vehicles present a range of the electric vehicle to an occupant of the electric vehicle. Simply presenting the range, however, does not instill much confidence in an amount of energy remaining in a battery of the electric vehicle, thereby increasing an anxiety of the occupant. For example, at least some ranges are determined based on limited, outdated, and/or inaccurate information.

BRIEF SUMMARY

In one aspect, a method is provided for reducing range anxiety in a vehicle including a motor coupled to a battery. The method includes determining a first range for a state-of-charge associated with the battery, determining a second range for the state-of-charge associated with the battery based on a first set of information, determining a third range for the state-of-charge associated with the battery based on a second set of information different from the first set of information, and displaying a map including a first zone associated with the first range, a second zone associated with the second range, and a third zone associated with the third range.

In another aspect, a computer-readable storage media having computer-executable instructions embodied thereon is provided. When executed by at least one processor, the computer-executable instructions cause the processor to determine a first range for a state-of-charge associated with a battery, determine a second range for the state-of-charge associated with the battery based on a first set of information, determine a third range for the state-of-charge associated with the battery based on a second set of information different from the first set of information, and present a map including a first zone associated with the first range, a second zone associated with the second range, and a third zone associated with the third range.

In yet another aspect, a computing device connectable to a vehicle is provided. The computing device includes a processor, and a computer-readable storage media having computer-executable instructions embodied thereon. When executed by the processor, the computer-executable instructions cause the processor to retrieve a state-of-charge associated with a battery, determine a second range for the state-of-charge associated with the battery based on a first set of information, and present, on a display associated with the vehicle, a map including a first zone associated with the first range and a second zone associated with the second range.

The features, functions, and advantages described herein may be achieved independently in various embodiments of the present disclosure or may be combined in yet other embodiments, further details of which may be seen with reference to the following description and drawings.

Although specific features of various implementations may be shown in some drawings and not in others, this is for convenience only. Any feature of any drawing may be referenced and/or claimed in combination with any feature of any other drawing.

DETAILED DESCRIPTION OF THE INVENTION

Generally described, the present disclosure relates to human-machine interface (HMI) systems. More particularly, the present disclosure relates to methods and systems for reducing range anxiety in a vehicle powered at least partially by a battery. The vehicle may include a battery, a display, and a computing device coupled to the display. The computing device may determine a first range for a state-of-charge associated with the battery, determine a second range for the state-of-charge associated with the battery based on a first set of information, determine a third range for the state-of-charge associated with the battery based on a second set of information, and present, on the display, a map including a first zone associated with the first range, a second zone associated with the second range, and a third zone associated with the third range. Accordingly, an occupant of the electric vehicle is presented with a plurality of zones that enable the occupant to make an informed decision regarding a drivable range associated with the electric vehicle.

As used herein, an element or step recited in the singular and preceded with the word "a" or "an" should be understood as not excluding plural elements or steps, unless such exclusion is explicitly recited. Furthermore, references to an "implementation" or an "embodiment" of the subject matter described herein are not intended to be interpreted as excluding the existence of additional implementations that also incorporate the recited features. The following detailed description of implementations consistent with the principles of the disclosure refers to the accompanying drawings. In the absence of a contrary representation, the same reference numbers in different drawings may identify the same or similar elements.

Figure 1:
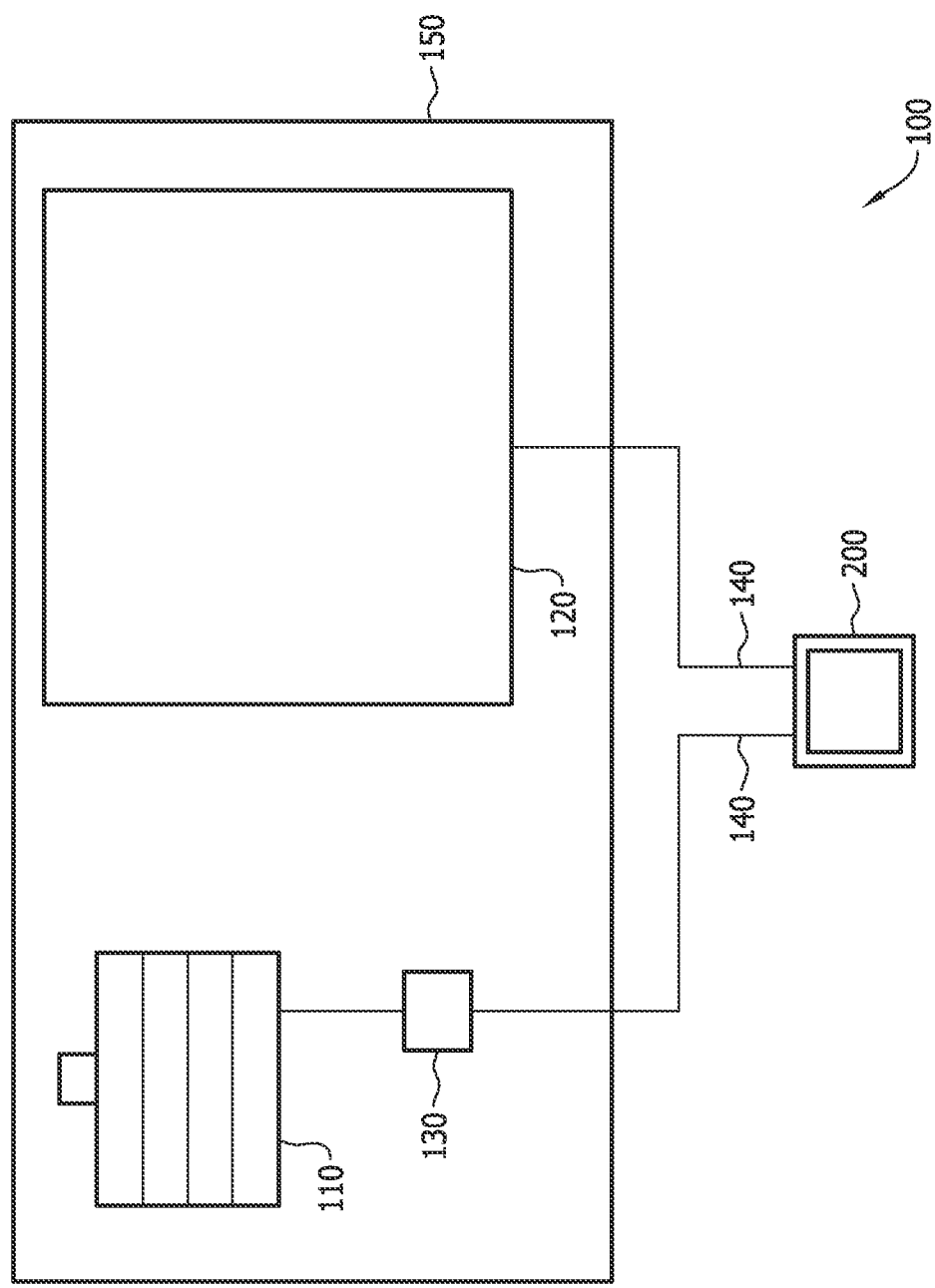
FIG. 1 is a schematic illustration of an exemplary human-machine interface (HMI) system environment in accordance with one aspect of the present disclosure.

FIG. 1 is a schematic illustration of an exemplary HMI system environment 100 associated with an electric vehicle 150. In the exemplary embodiment, environment 100 may be in any electric vessel, aircraft, and/or vehicle including, without limitation, an automobile, a truck, a boat, a helicopter, and/or an airplane. Electric vehicle 150 may be any type of electric vehicle including, without limitation, a battery electric vehicle, a hybrid vehicle, and/or a plug-in hybrid electric vehicle.

In the exemplary embodiment, environment 100 includes at least one battery pack or battery 110 that is configured to provide at least some electric power to electric vehicle 150, and at least one display 120 that is configured and/or oriented to present an image to an occupant (not shown) positioned within environment 100. In at least some implementations, display 120 is a heads-up display (HUD) projected onto a windshield of electric vehicle 150, a screen that is mounted on a dashboard, and/or a screen on a tablet, smartphone, or other mobile device. As used herein, a HUD is any display that includes an image that is at least partially transparent such that the occupant can selectively look at and/or through the image while operating electric vehicle 150. Alternatively, display 120 may be any type of display that enables the methods and systems to function as described herein.

In the exemplary embodiment, environment 100 includes at least one sensor 130. In the exemplary embodiment, sensor 130 is configured and/or oriented to detect and/or to determine a state-of-charge (SOC) that is indicative of an amount of energy stored within battery 110. For example, in one implementation, sensor 130 is configured to detect a specific gravity or pH of an electrolyte within battery 110. In another implementation, sensor 130 is configured to detect a voltage, a current, and/or an internal pressure associated with battery 110. Alternatively, any parameter of battery 110 may be detected that enables the methods and systems to function as described herein. In the exemplary embodiment, sensor 130 is configured to transmit a signal associated with the SOC to a computing device 200.

In one example, the SOC of battery 110 is determined by sensor 130, and provided to computing device 200 through a wire link 140. Alternatively, computing device 200 may be wirelessly connected to electric vehicle 150. The SOC of battery 110 may be determined by computing device 200 and/or any other device onboard electric vehicle 150. While computing device 200 is shown outside of electric vehicle 150, computing device 200 may be within electric vehicle 150.

Figure 2:
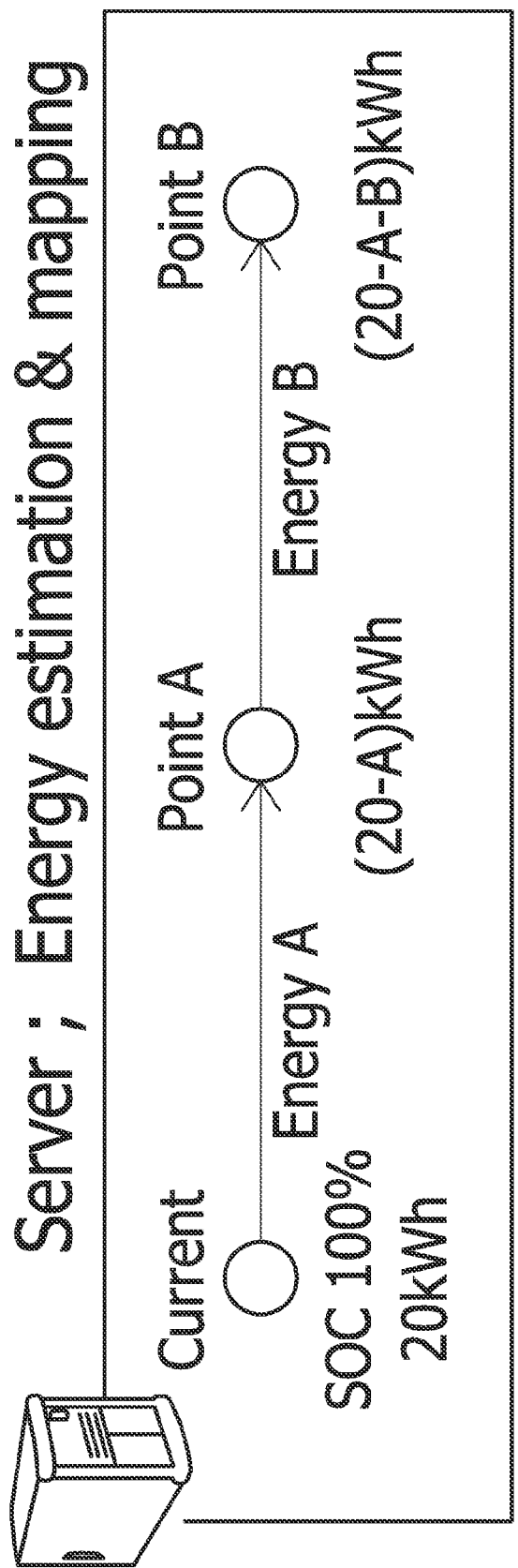
FIG. 2 is a schematic illustration of an exemplary method for determining a state-of-charge associated with a battery in accordance with one aspect of the present disclosure.

FIG. 2 is a schematic illustration of a method for determining and/or projecting an SOC. For example, in one implementation, a current SOC is 100% at 20 kWh. Travelling from a current location to Point A is projected to require A kWh. Accordingly, a projected SOC at Point A is (20-A) kWh. Travelling from Point A to Point B is projected to require B kWh. Accordingly, a projected SOC at Point B is (20-A-B) kWh.

In the exemplary embodiment, a 100% SOC is indicative of a fully-charged battery, and a 0% SOC is indicative of a fully-depleted battery. For example, a high SOC may be associated with battery 110 being at least 75% charged, a medium SOC may be associated with battery 110 being at least 50% and less than 75% charged, or a low SOC indicative may be associated with battery 110 being less than 50% charged. Alternatively, battery 110 may be associated with a depth-of-discharge (DoD), which is the inverse of SOC. A 100% DoD is indicative of a fully-depleted battery, and a 0% DoD is indicative of a fully-charged battery.

Figure 3:
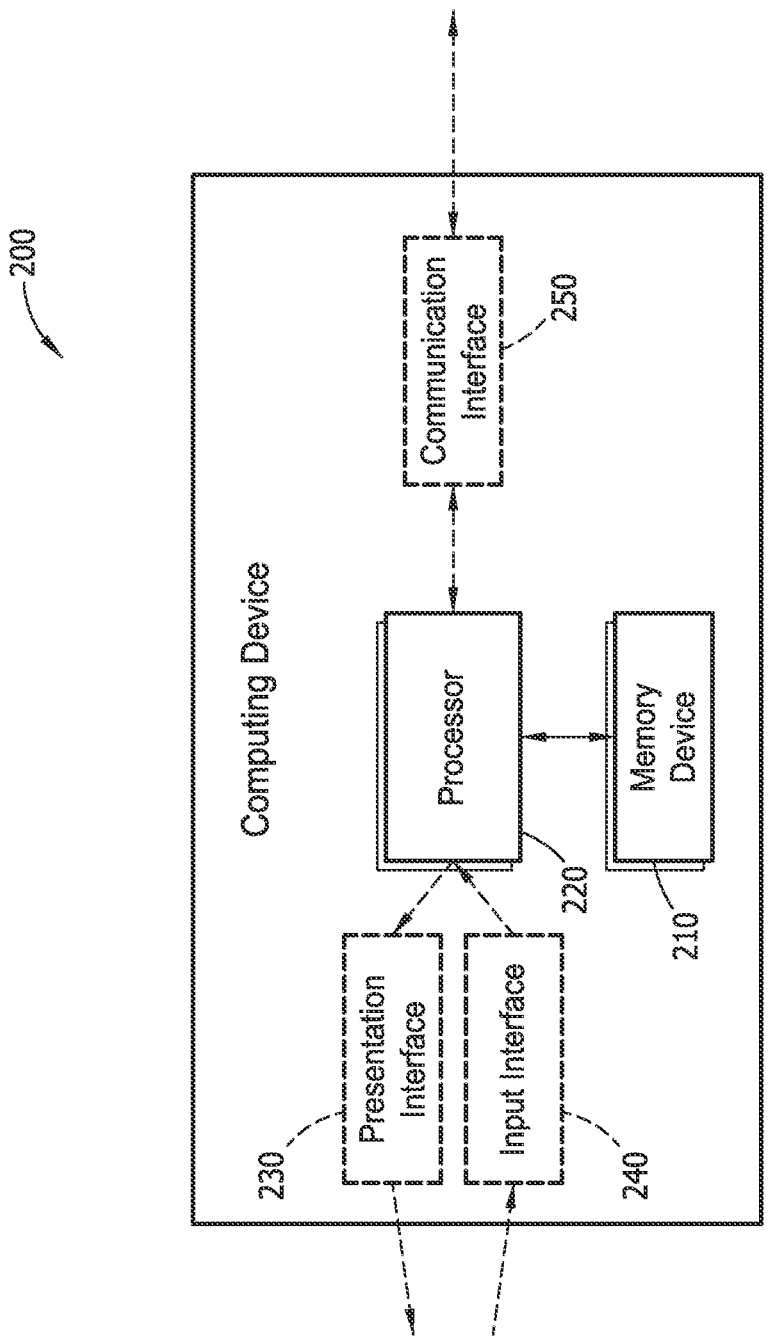
FIG. 3 is a schematic illustration of an exemplary computing device that may be used in the HMI system environment shown in FIG. 1 in accordance with one aspect of the present disclosure.

FIG. 3 is a schematic illustration of computing device 200. In the exemplary embodiment, computing device 200 includes at least one memory device 210 and a processor 220 that is coupled to memory device 210 for executing instructions. In some implementations, executable instructions are stored in memory device 210. In the exemplary embodiment, computing device 200 performs one or more operations described herein by programming processor 220. For example, processor 220 may be programmed by encoding an operation as one or more executable instructions and by providing the executable instructions in memory device 210.

Processor 220 may include one or more processing units (e.g., in a multi-core configuration). Further, processor 220 may be implemented using one or more heterogeneous processor systems in which a main processor is present with secondary processors on a single chip. In another illustrative example, processor 220 may be a symmetric multi-processor system containing multiple processors of the same type. Further, processor 220 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, memory device 210 is one or more devices that enable information such as executable instructions, historical data (including, for example, vehicle information, map information, and/or user information), and/or other data to be stored and retrieved. Memory device 210 may include one or more computer readable media, such as, without limitation, dynamic random access memory (DRAM), static random access memory (SRAM), a solid state disk, and/or a hard disk. Memory device 210 may be configured to store, without limitation, application source code, application object code, source code portions of interest, object code portions of interest, configuration data, execution events and/or any other type of data.

In the exemplary embodiment, computing device 200 includes a presentation interface 230 (e.g., display 120) that is coupled to processor 220. Presentation interface 230 is configured to present information to an occupant of electric vehicle 150. For example, presentation interface 230 may include a display adapter (not shown) that may be coupled to a display device, such as a cathode ray tube (CRT), a liquid crystal display (LCD), an organic LED (OLED) display, and/or an "electronic ink" display. In some implementations, presentation interface 230 includes one or more display devices.

In the exemplary embodiment, computing device 200 includes an input interface 240 (e.g., sensor 130) that is coupled to processor 220. Input interface 240 is configured to receive input from an occupant of electric vehicle 150. Input interface 240 may include, for example, a keyboard, a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 230 and input interface 240.

Computing device 200, in the exemplary embodiment, includes a communication interface 250 coupled to processor 220. Communication interface 250 communicates with one or more remote devices. To communicate with remote devices, communication interface 250 may include, for example, a wired network adapter, a wireless network adapter, and/or a mobile telecommunications adapter.

In one implementation, communication interface 250 is a network interface that enables map information and/or emergency contact information information to be retrieved and/or obtained through a cellular network and/or a WiFi network. Map information and/or emergency contact information may be stored at any source including locally on computing device 200 and/or a remote server.

Map information may include any information associated with the vicinity of electric vehicle 150 including topography, traffic data, and/or driving history, such as topography, altitude, speed limits, traffic history, stop-and-go frequency, stop light locations, charging station locations, and the like. In at least some implementations, sensor 130 (shown in FIG. 1) is positioned and/or oriented to detect and/or otherwise enable computing device 200 (shown in FIG. 1) to determine the map information, such as a current location, a current altitude, a current speed, and the like. Alternatively, sensor 130 may be positioned and/or oriented to detect any map information that enables the methods and systems to function as described herein.

Emergency contact information may include contact information for an emergency service provider. In one implementation, the emergency contact is retrieved from a remote source, such as a tablet, smartphone, or other mobile device, or the Internet. For example, in such an implementation, the emergency contact may be retrieved from an address book stored in the remote source. In another implementation, the emergency contact is stored locally at memory device 210. Alternatively, the emergency contact may be retrieved using any mechanism and/or algorithm that enables the methods and systems to function as described herein.

Figure 4:
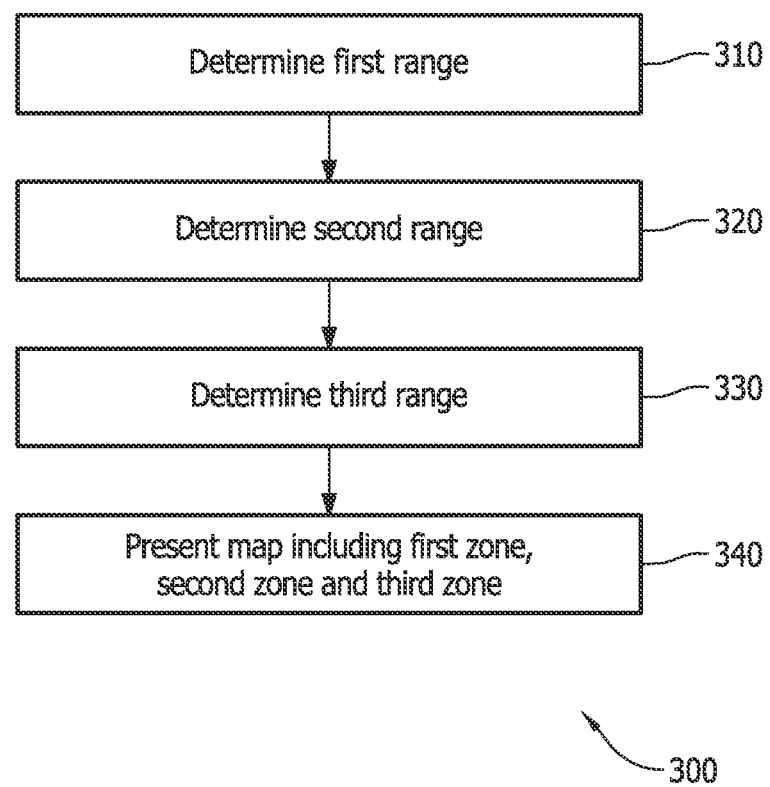
FIG. 4 is a flowchart of an exemplary method that may be implemented by the computing device shown in FIG. 3 in accordance with one aspect of the present disclosure.
Figure 5:
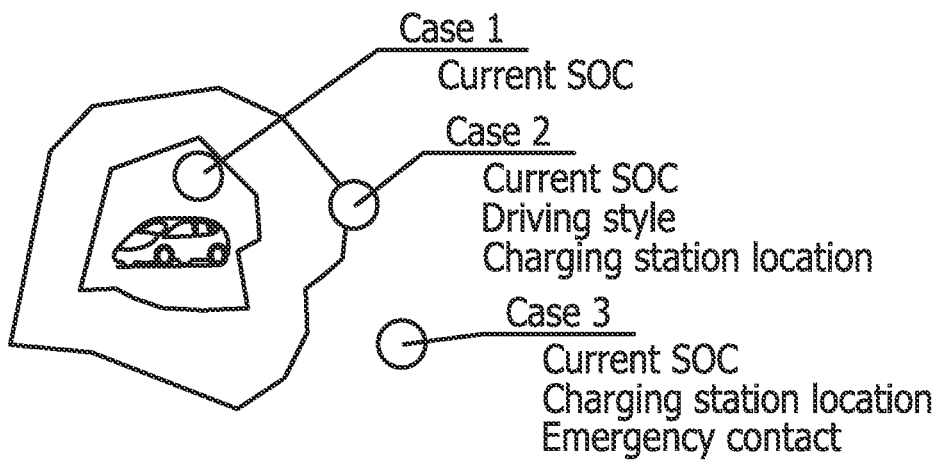
FIG. 5 is a schematic representation of an exemplary algorithm that may be implemented by the computing device shown in FIG. 3 in accordance with one aspect of the present disclosure.
Figure 6:
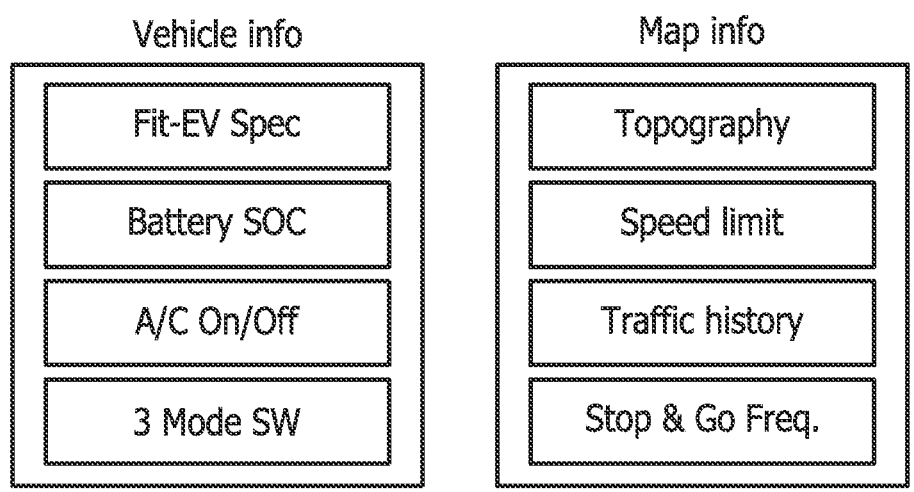
FIG. 6 is a schematic illustration of exemplary vehicle information and map information that may be used by the computing device shown in FIG. 3 in accordance with one aspect of the present disclosure.

FIG. 4 is a flowchart of an exemplary method 300 that may be implemented by computing device 200 (shown in FIG. 3). In the exemplary embodiment, a plurality of ranges are determined based at least partially on a plurality of sets of information. FIG. 5, for example, is a schematic representation of one algorithm that may be used to determine the plurality of ranges. FIG. 6 shows a listing of some examples of map information and vehicle information that may be used to determine at least some of the plurality of ranges.

Vehicle information may include any information associated with electric vehicle 150 including vehicle specifications, engine specifications, and/or battery specifications, such as an SOC, a state of an air-conditioning system, a driving mode, and the like. In at least some implementations, sensor 130 is positioned and/or oriented to detect and/or otherwise enable computing device 200 to determine the vehicle information, such as a current SOC, a current state of an air-conditioning system, and/or a current driving mode. Alternatively, sensor 130 may be positioned and/or oriented to detect any vehicle information that enables the methods and systems to function as described herein.

In the exemplary embodiment, a first range is determined 310 for a SOC (e.g., a current SOC) based on at least some map information associated with a vicinity of electric vehicle 150 and/or at least some vehicle information associated with electric vehicle 150 (e.g., a current SOC), but not based on at least some other information that may be used to determine a range for the SOC including, without limitation, charging station locations, driving style, and/or emergency contact information. For example, in at least some implementations, the at least some other information may be inaccessible and/or otherwise unavailable. Accordingly, the first range is a relatively conservative range that enables the occupant to operate electric vehicle 150 with at least some confidence that electric vehicle 150 has available energy.

In the exemplary embodiment, a second range is determined 320 for the predetermined SOC based on a first set of information. In the exemplary embodiment, the first set of information includes map information (e.g., charging station location information) and/or vehicle information, and driving style information associated with a driving style. The second range is a relatively moderate range that enables the occupant to operate electric vehicle 150 with at least some confidence that electric vehicle 150 has available energy. For example, knowledge of nearby charging stations may facilitate reducing an occupant's anxiety. Increasing a range by dynamically adjusting a driving style may also facilitate reducing an occupant's anxiety. Alternatively, the first set of information may include any information that enables the methods and systems to function as described herein.

In one implementation, a driving style is determined based at least partially on parameters detected by sensor 130. For example, in such an implementation, quick vehicle acceleration and/or deceleration, frequent changes in the steering wheel angle, and/or high brake pedal forces may be associated with an aggressive driving style, wherein slow vehicle acceleration and/or deceleration, seldom changes in the steering wheel angle, and/or low brake pedal forces may be associated with a conservative driving style. Alternatively, sensor 130 may detect any parameter, including a vehicle position, a vehicle speed, a vehicle acceleration, a steering wheel angle, a brake pedal position, a brake pedal force, an acceleration pedal position, and/or an acceleration pedal force, that enables the methods and systems to function as described herein.

In another implementation, the driving style is determined based at least In some implementations, a first vehicle condition may be associated with a first SOC, and a second vehicle condition may be associated with a second SOC. For example, in one implementation, electric vehicle 150 operates and/or is projected to operate under a sport mode and/or with an air-conditioning system running when battery 110 is associated with a higher SOC, under a standard mode and/or with an air-conditioning system running when battery 110 is associated with an intermediate SOC, and under an economy mode and/or with an air-conditioning system not running when battery 110 is associated with a lower SOC. As used herein, the sport mode is a first driving mode that enables electric vehicle 150 to operate at an elevated performance level (e.g., upshift gears at a higher RPM range than when electric vehicle 150 is in the standard mode), and the economy mode is a second driving mode that enables electric vehicle 150 to operate at an energy-efficient performance level. Alternatively, each vehicle condition may include and/or incorporate any function and/or feature that enable the methods and systems to function as described herein. partially on a predetermined or recommended driving style.

In one implementation, charging station locations are identified and/or determined based at least partially on information stored locally at memory device 210 (shown in FIG. 3), information retrieved and/or received from a sensor 130 (e.g., GPS sensor), and/or information retrieved and/or received from the Internet. Alternatively, charging station location information may be identified using any mechanism and/or algorithm that enables the methods and systems to function as described herein.

In some implementations, a third range is determined 330 for the SOC based on a second set of information. In some implementations, the second set of information includes map information (e.g., charging station location information) and/or vehicle information, and emergency contact information associated with an emergency contact. That is, in some implementations, the second set of information is different from the first set of information in that the first set of information does not include at least the emergency contact information, and the second set of information includes at least the emergency contact information. Alternatively, the first set of information and/or the second set of information may include any information that enables the methods and systems to function as described herein. The third range is a relatively aggressive range that enables the occupant to operate electric vehicle 150 with at least some confidence that electric vehicle 150 has available energy. For example, knowledge of nearby charging stations may facilitate reducing an occupant's anxiety. Knowledge of nearby emergency service providers may also facilitate reducing an occupant's anxiety. Alternatively, the second set of information may include any information that enables the methods and systems to function as described herein.

Figure 7:
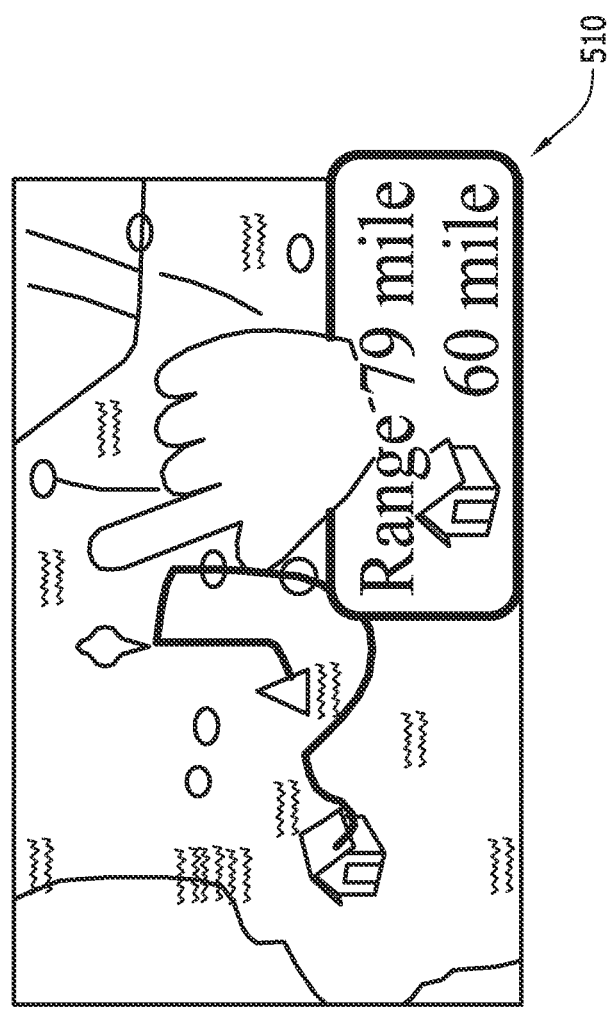
FIG. 7 is a screenshot of an exemplary map that may be presented by the computing device shown in FIG. 3 in accordance with one aspect of the present disclosure.

In the exemplary embodiment, a first, short-range zone associated with the first range, a second, intermediate zone associated with the second range, and/or a third zone associated with the third, long-range range are presented 340 on display 120 (shown in FIG. 1). FIG. 7 is a screenshot of an exemplary map 510 that may be presented 340 on display 120 to enable an occupant of electric vehicle 150 to easily plan trips with charging station information. For example, in one implementation, map 510 includes a window including a projected range (e.g., 79 miles), and a determined distance (e.g., 60 miles) to a point of interest (e.g., a charging station). In the exemplary embodiment, map 510 may include a projected route extending between a current location and a projected location (e.g., a destination).

In some implementations, information may be selectively presented 340 based on a proximity of the destination to the current location. For example, in one implementation, a recommended driving style and/or charging station locations are presented 340 when a destination is within a shorter-range zone (i.e., an area in relatively close proximity to electric vehicle 150), and a projected range of electric vehicle 150, charging station locations, and/or emergency contact information are presented 340 when the destination is within a longer-range zone (i.e., an area generally remote from electric vehicle 150). In another implementation, at least some points of interest (e.g., charging station locations) within a shorter-range zone are presented 340, and charging station locations within a longer-range zone are not presented 340. Alternatively, any combination of information may be presented 340 using any mechanism and/or algorithm that enables the methods and systems to function as described herein.

In some implementations, information may be selectively presented 340 based on a SOC associated with battery 110. For example, in one implementation, a recommended driving style and/or charging station locations are presented 340 when battery 110 is associated with a higher SOC, and a projected range of electric vehicle 150, charging station locations, and/or emergency contact information are presented 340 when battery 110 is associated with a lower SOC. Alternatively, any combination of information may be presented 340 using any mechanism and/or algorithm that enables the methods and systems to function as described herein.

In some implementations, a vehicle condition is automatically set based at least partially on a current SOC. For example, in one implementation, computing device 200 may automatically set the driving mode of electric vehicle 150 to an economy mode and turns off the air-conditioning system when a low SOC is determined.

The methods and systems described herein may be implemented using computer programming or engineering techniques including computer software, firmware, hardware or any combination or subset thereof, wherein the technical effects may be achieved by performing at least one of the following steps: a) determining a first range for a state-of-charge associated with a battery; b) determining a second range for the state-of-charge associated with the battery based on a first set of information; c) determining a third range for the state-of-charge associated with the battery based on a second set of information different from the first set of information; and d) displaying a map including a first zone associated with the first range, a second zone associated with the second range, and a third zone associated with the third range.

The present disclosure relates to human-machine interface (HMI) systems and, more particularly, to methods and systems for methods and systems for reducing range anxiety in an electric vehicle including a battery. The methods and systems described herein enable an occupant of the electric vehicle to make an informed decision regarding a drivable range associated with the electric vehicle.

Exemplary embodiments of an HMI system are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of reducing range anxiety in a vehicle including a motor coupled to a battery, the method comprising:
    determining a state-of-charge associated with the battery using at least one sensor communicatively coupled with the battery;
    determining a first drivable range of the vehicle for the state-of-charge associated with the battery;
    determining a second drivable range of the vehicle for the state-of-charge associated with the battery based on a first set of information;
    determining a third drivable range of the vehicle for the state-of-charge associated with the battery based on a second set of information, the second set of information different from the first set of information; and
    displaying a map including a first zone associated with the first drivable range, a second zone associated with the second drivable range, and a third zone associated with the third drivable range.

2. The method of claim 1, wherein determining the first drivable range, the second drivable range, and the third drivable range comprises retrieving topography information, and calculating the first drivable range, the second drivable range, and the third drivable range based on the topography information and the state-of-charge associated with the battery.

3. The method of claim 1, wherein determining the first drivable range comprises retrieving the state-of-charge associated with the battery.

4. The method of claim 1, wherein determining the second drivable range comprises retrieving a driving style of a driver of the vehicle.

5. The method of claim 4 wherein retrieving a driving style of the driver comprises extracting the driving style from the vehicle.

6. The method of claim 1 wherein determining the second drivable range comprises retrieving a driving style of a driver of the vehicle and charging station location information.

7. The method of claim 1 wherein determining the second drivable range comprises retrieving a driving style of a driver of the vehicle and charging station location information, and wherein determining the third range comprises retrieving the charging station location information and emergency contact information.

8. A computer-readable storage media having computer-executable instructions embodied thereon, wherein, when executed by a processor, the computer-executable instructions cause the processor to:
    determine a state-of-charge associated with a battery coupled to a motor of a vehicle based on a signal received from at least one sensor communicatively coupled with the battery;
    determine a first drivable range of the vehicle for the state-of-charge associated with the battery;
    determine a second drivable range of the vehicle for the state-of-charge associated with the battery based on a first set of information;
    determine a third drivable range of the vehicle for the state-of-charge associated with the battery based on a second set of information, the second set of information different from the first set of information; and
    present a map including a first zone associated with the first drivable range, a second zone associated with the second drivable range, and a third zone associated with the third drivable range.

9. The computer-readable storage media of claim 8, wherein the computer-executable instructions cause the processor to determine the first drivable range, the second drivable range, and the third drivable range based on topography information and the state-of-charge associated with the battery.

10. The computer-readable storage media of claim 8, wherein the computer-executable instructions cause the processor to retrieve the state-of-charge associated with the battery.

11. The computer-readable storage media of claim 8, wherein the computer-executable instructions cause the processor to determine the second drivable range based on the state-of-charge associated with the battery, a driving style of a driver of the vehicle, and charging station location information.

12. The computer-readable storage media of claim 8, wherein the computer-executable instructions cause the processor to determine the third drivable range based on the state-of-charge associated with the battery, charging station location information, and emergency contact information.

13. The computer-readable storage media of claim 8, wherein the computer-executable instructions cause the processor to determine the first drivable range without a driving style of a driver of the vehicle, charging station location information, and emergency contact information.

14. A computing device connectable to a vehicle including a motor coupled to a battery, the computing device comprising:
    a processor; and
    a computer-readable storage media having computer-executable instructions embodied thereon, wherein, when executed by the processor, the computer-executable instructions cause the processor to:
    determine a state-of-charge associated with a battery based on a signal received from at least one sensor communicatively coupled with the battery;
    determine a first drivable range of the vehicle for the state-of-charge associated with the battery;
    determine a second drivable range of the vehicle for the state-of-charge associated with the battery based on a first set of information;
    determine a third drivable range of the vehicle for the state-of-charge associated with the battery based on a second set of information different from the first set of information; and
    present, on a display associated with the vehicle, a map including a first zone associated with the first drivable range, a second zone associated with the second drivable range, and a third zone associated with the third drivable range.

15. The computing device of claim 14, wherein the computer-executable instructions cause the processor to retrieve map information from a cellular network.

16. The computing device of claim 14, wherein the computer-executable instructions cause the processor to retrieve vehicle information from the vehicle, wherein the first set of information includes the vehicle information.

17. The computing device of claim 14, wherein the computer-executable instructions cause the processor to retrieve a driving style from the vehicle.

18. The computing device of claim 14, wherein the computer-executable instructions cause the processor to retrieve an emergency contact from a remote source, wherein the second set of information includes emergency contact information associated with the emergency contact.

19. The computing device of claim 18 wherein the computer-executable instructions cause the processor to retrieve the emergency contact information from a cellular network.

* * * * *